United States Patent [19]

Gyugyi et al.

[11] Patent Number: 5,329,222

[45] Date of Patent: Jul. 12, 1994

[54] APPARATUS AND METHOD FOR DYNAMIC VOLTAGE RESTORATION OF UTILITY DISTRIBUTION NETWORKS

[75] Inventors: Laszlo Gyugyi, Penn Hills Township, Allegheny County; Colin D. Schauder, Murrysville; Charles W. Edwards, Monroeville; Miklos Sarkozi, Murrysville, all of Pa.

[73] Assignee: Westinghouse Electric Corporation, Pittsburgh, Pa.

[21] Appl. No.: 983,492

[22] Filed: Nov. 30, 1992

[51] Int. Cl.⁵ .................................................. G05F 1/70
[52] U.S. Cl. .................................... 323/207; 307/102; 307/105; 363/98
[58] Field of Search ............... 323/207; 307/105, 102; 363/95-98

[56] References Cited

U.S. PATENT DOCUMENTS

| | | | |
|---|---|---|---|
| 4,903,184 | 2/1990 | Hirose | 363/37 |
| 4,994,981 | 2/1991 | Walker et al. | 323/207 X |
| 5,041,959 | 8/1991 | Walker | 323/207 X |
| 5,051,683 | 9/1991 | Hirose et al. | 323/207 |
| 5,198,746 | 3/1993 | Gyugi et al. | 323/207 |

*Primary Examiner*—Emanuel T. Voeltz

[57] ABSTRACT

A system and method is provided compensating utility distribution line transients such as voltage sags in a dynamic manner, by inserting a voltage signal in series with the distribution signal having a magnitude and phase to effectively cancel out the voltage deviation caused by a network disturbance. An energy storage device such as a storage capacitor is used to provide energy to an inverter circuit which is controlled to generate the series-inserted signal. Preferably a converter such as a chopper is utilized between the storage element and the inverter, to provide a constant dc input to the inverter. A controller generates a corrective error signal based upon the deviation between the utility supply voltage as affected by the disturbance, and the nominal ideal voltage signal, and adjusts the insertion voltage so as to optimize real power delivery to the utility distribution line.

18 Claims, 4 Drawing Sheets

APPARATUS AND METHOD FOR DYNAMIC VOLTAGE RESTORATION OF UTILITY DISTRIBUTION NETWORKS

BACKGROUND OF THE INVENTION

1. Field of the Invention

This invention relates to circuits for maintaining constant voltage on utility distribution networks and, more particularly, circuits for dynamically compensating for transient electrical disturbances in the supply to a distribution network so as to reduce and substantially eliminate transient interruptions such as voltage sags.

2. Description of the Prior Art

In recent years, quality requirements related to the delivery of electric power have increased dramatically. Modern automated manufacturing and process controls use complex machinery and data handling equipment which employ massive amounts of sophisticated circuits, e.g., solid-state electronic switching circuits and the like. Such circuits rely on substantially disturbance-free electric power which is provided by a utility distribution network. Due to their basic operation and internal structure, many modern electric circuits are sensitive to electrical disturbances and noises which may cause them to malfunction or even to fail, in turn interrupting or shutting down completely manufacturing and other processes. For example, it is well known that digital computers, and thus computer-controlled system loads, are critically sensitive to maintenance of a uniform utility signal. Consequently, interruptions or disturbances on the side of the distribution network which supplies power to these loads can cause significant waste in production time and material and manufacturing, and substantial monetary losses in commercial operations.

Disturbances in electrical utility supply networks (transmission and distribution) might be caused for a variety of reasons. Power equipment faults and insulation failures, line switchings, capacitor switchings, large transformer and motor energizations, and non-linear loads such as arc furnaces, variable speed drives, rectifiers, etc. are only a few such causes. Such transient disturbances, as distinguished from complete power failure, manifest themselves as momentary power supply interruptions, voltage sags, voltage transients, voltage magnitude variations, and harmonics. Thus, voltage sags and transients may be caused by failures or switchings within a particular transmission or distribution line. Moreover, several lines in the transmission and distribution system may be tied to a single bus, such that these lines in parallel connection in effect feed a common bus. Because of this nature of power transmission and distribution networks, single line faults and switchings frequently do not result in power interruptions at the bus or in another line connected to that bus, but only in voltage sags and transients. The magnitude of such sags and transients is dependent upon the length and impedance characteristic of the lines involved in the overall network. Likewise, harmonic voltage components may be produced across the line impedance by harmonic load currents drawn by non-linear loads. These and other like disturbances are transient in nature, and are usually manifested by a change in peak-to-peak amplitude of the utility voltage and/or transient spikes and harmonics. Hereinafter, the term "disturbances" will refer to any of these conditions.

The field of this invention is that of providing a dynamic response to a power distribution line which carries power to a number of loads, at least some of which are sensitive to power line disturbances of the type described above. The field is similar to, but distinct from, that of the uninterruptible power supply (UPS) which is designed to interface between the utility-provided electric power line and critical equipment, such as a computer or data storage element. The UPS concept is to have a DC energy device, usually a battery, which is maintained in a charged state by connection to the power line, and to employ a dc to ac inverter to convert the dc battery power to the desired ac power. This is accomplished by generating a single-phase (or three-phase) alternating voltage which is identical to the normal utility voltage, i.e., has the same frequency and amplitude, and is synchronism with it. There are two basic philosophies with regard to UPS devices. In one basic arrangement, the battery/inverter system normally provides the power for the critical load and the power line is used to keep the battery charged. A bypass switch is employed to get the utility power direct to the load only if the power/inverter system fails. This arrangement provides a substantially total isolation from the utility power system, and thus can provide a small amount of power that is essentially free of system disturbances. However, it has the disadvantage of requiring power conversion equipment that is operated normally at rated power and, accordingly, may introduce appreciable losses, particularly at higher power levels. Such an approach is not feasible for dynamic compensation of transient disturbances on a distribution line that is providing a significant amount of power to the loads attached to it.

In another UPS arrangement, the battery/inverter is connected essentially in parallel with the utility power system, but maintained normally in a stand-by state so that the power demand of the load is provided by the utility system via a fast circuit breaker (preferably solid-state) which can isolate the faulty utility system from the load and the battery/inverter power supply. With such a UPS, in the case of a power system disturbance or loss of power for a significant time, the circuit breaker is opened and the load is supplied directly from the battery/inverter system. When the power system is restored to its normal operation, the breaker is closed and the battery/inverter system goes back into stand-by, with power being supplied directly from the utility line. In this arrangement, the power conversion equipment is again fully rated, but the operating losses and cost are lower. The disadvantage of this arrangement is that it is difficult to make it responsive to fast dynamic transient conditions, or disturbances of relatively short duration, such that transients and harmonics can get to the load. Also, if a disturbance is recognized and reacted to quickly, then the battery must supply the entire load for the duration of the disturbance. While this is an adequate solution for relatively small power-consuming loads, it is not an appropriate solution for a utility distribution network which at any given moment may be providing a significant load. Consequently, the UPS philosophy is not acceptable to the utility environment which this invention addresses.

For voltage regulation of a utility line, the method of series (i.e., capacitive) line impedance compensation is known in the art. Thus, it is known that voltage variations in transmission and distribution systems may be caused by the voltage drop developing across the normally inductive series line impedance as a result of changing line (load) current. This variation in voltage available on the line can be reduced by partially cancelling the line inductance, which is done by connecting a predetermined amount of capacitance in series with the line. The function of the series capacitor is effectively to inject a voltage into the line at the fundamental frequency so as to oppose the voltage drop developed across the inductive line impedance at the same frequency. This results in reducing the voltage drop to an equivalent to that of a shorter utility line with a smaller inductance. Further, it is known that if an ac voltage which has a quadrature phase relationship with the line current at the fundamental frequency (i.e., the voltage lags the current by 90 electrical degrees), the amplitude of which is made portional to that of the line current, is injected in series with the line, a series compensation functionally equivalent to that produced by a series capacitor is obtained. This technique, utilizing a solid-state inverter for injecting the compensating signal in series with the line, is disclosed in U.S. Pat. No. 5,198,746, issued Mar. 30, 1993, and assigned to the same assignee as this invention. With this technique, the magnitude of the inverter output voltage which is inserted in series with the line can be varied continuously, and its polarity can be changed from that representative of a capacitor to that of an inductor, whereby the effective line impedance can be varied over a wide range. This technique is very efficient, and permits steady state maintenance of the line voltage at a substantially constant amplitude even in the face of large line current variations. It does not, however, meet the need for dynamic compensation of disturbances which require a real power input to the line in order to effectuate compensation. Thus, in the case of voltage sags, or transients which represent a dynamic change in real power which would otherwise be delivered to the load, there remains a need for an efficient and reliable mechanism for responding so as to minimize variations in the distribution line signal delivered to the loads that are tied to it.

SUMMARY OF THE INVENTION

It is an object of this invention to provide a system and method for compensation of utility line signals which utilizes a partially and transiently rated energy compensation circuit designed to reduce voltage sags and transients substantially instantaneously, i.e., dynamically, and which can also provide voltage regulation and harmonic voltage reduction. The invention utilizes an energy storage and inverter system which can generate a voltage which is introduced in series with the utility distribution line so as to compensate for any dynamic deviation of the utility signal from the desired steady state waveform. Since the system is operated only during utility disturbances, and it only compensates for differences from a desired utility reference signal, it is, in general, not required to provide full power to the line. Since the dynamic voltage restorer system of this invention operates to provide a power output only during system disturbances, it requires no circuit breaker for fault isolation, its initial cost is relatively low, and its efficiency is relatively high. It thus achieves a primary object of providing means for restoring bulk electric power quality within the utility distribution system, and not just at a point where an isolated load is connected to the utility line.

In practice, the system of this invention is realized suitably by five basic elements. An energy storage device, such a large dc storage capacitor rechargeable from the utility line, provides an energy source for providing real power. A chopper is used for converting the energy supply output (which may have a variable dc voltage) to a constant dc voltage link. The constant dc link voltage is converted by an inverter into an ac injection voltage, under the control of a controller which generates a dynamic control signal as a function of both the real power to be inserted into the distribution line and the voltage correction required to maintain load voltage substantially constant. The output from the inverter is coupled through an injection element, such as a transformer, into series with the power distribution network, such that the source voltage signal from the utility is vectored together with the inserted voltage signal to maintain a substantially uniform voltage signal which is available to the load, i.e., transient disturbances are dynamically compensated for by the injected voltage signal.

DESCRIPTION OF THE PREFERRED EMBODIMENTS

The system and method of this invention utilize the observation that in most cases the power on the distribution line feeding one or more sensitive loads is not totally lost. This invention is aimed toward the situation where the magnitude of the line voltage during the disturbance may be significantly smaller than the rated voltage, but still remains greater than zero. Thus, in the perspective of this invention, the distribution line is still supplying a percentage of normal power, while the disturbance represents a deviation from the normal steady state condition. Thus, a voltage sag can be viewed as if some amount of fundamental frequency ac voltage, with an amplitude corresponding to the sag, is temporarily subtracted from the line voltage. Similarly, a switching transient may be viewed as a voltage spike with an exponentially decaying voltage component (with a frequency spectrum determined by the network impedance parameters) which is added to the normal ac line voltage. It follows that if such temporary voltage components which are effectively added to the fundamental ac voltage by the disturbances to cause sags and transients can be cancelled by injecting in the distribution line the same disturbance voltages with opposite polarity, then the supply voltage which is connected to the sensitive loads can in effect be restored to its original undisturbed form. Thus, the basic design philosophy of this invention is to inject in series with the line voltage those voltage components needed to negate and thus cancel out the components caused by the network disturbances.

Figure 1A:
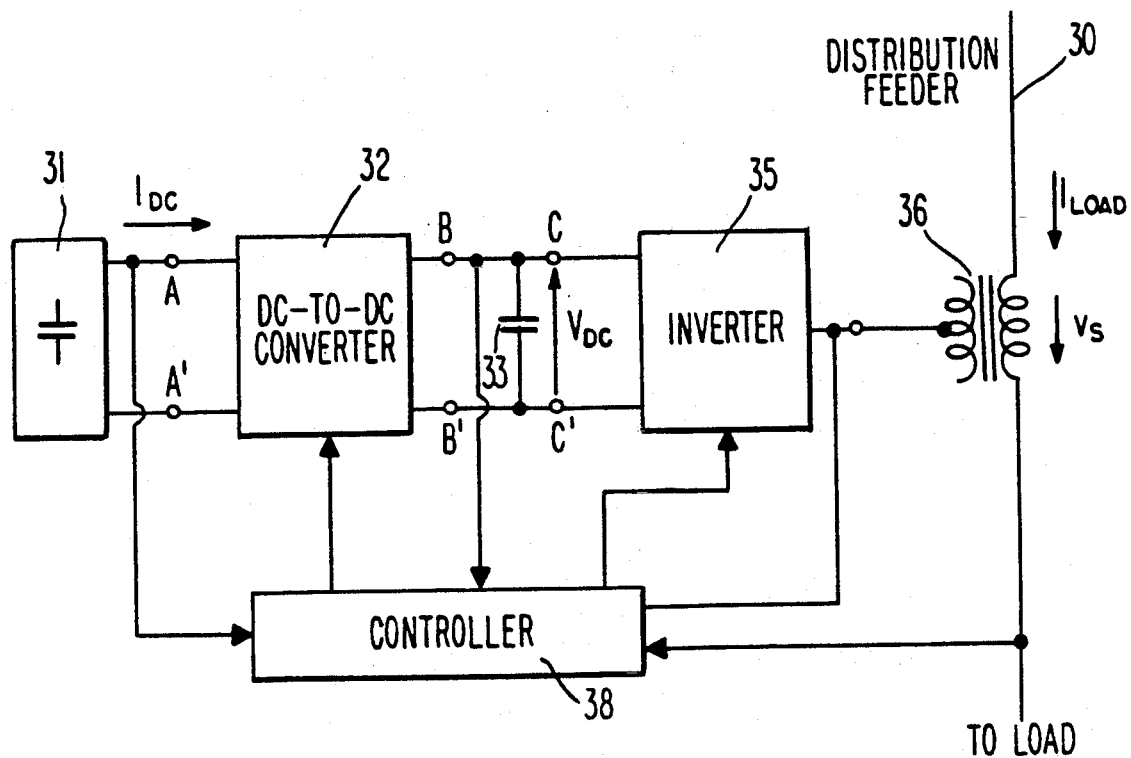
FIG. 1A is a simplified block diagram of the network comprising the dynamic voltage restorer system of this invention.

The basic system of this invention is set forth in FIG. 1A. An energy storage device 31, is utilized to provide the power needed to generate the voltage signal which is injected into the distribution line 30. The storage device may be a relatively large dc storage capacitor, a bank of batteries, a superconducting magnetic energy storage coil, or the like. For purposes of illustration, it will be assumed that a storage capacitor is utilized. In a preferred embodiment, a dc-to-dc inverter interface unit 32 is employed between the storage device 31 and the inverter unit 35, which inverter is controlled to generate the insertion signal. The purpose of converter 32 is to manage the bidirectional power flow between storage device 31 and the inverter 35 so that the operating levels of the inverter can be maintained at optimal values. In practice, in the process of restoring and retrieving energy from the storage capacitor 31, the voltage across the storage capacitor is necessarily varied. Since there are advantages to operating the inverter at a constant dc link voltage, the converter 32 is utilized to transfer power from (or to) the storage capacitor (at terminals A—A') to a fixed dc link voltage (at terminals B—B'). As discussed in more detail hereinabove, the storage capacitor 31 is generally held at a higher voltage, and the output of converter 32, which is connected to the dc link (terminals B—B', capacitor 33, and terminals C—C') is maintained at a constant voltage. The controlled fixed voltage from the dc link is inverted in inverter 35, under the control of control unit 38, to provide an output voltage signal represented as $v_s$, which is inserted in series in the distribution line 30 by transformer 36.

As is seen in more detail below, control unit 38 receives various inputs representative of different currents and voltages and dynamically alters the output of inverter 35 so as to provide instantaneous generation of a $v_s$ signal which is equal and opposite to the disturbance, thereby substantially maintaining the voltage on the line 30 as a constant amplitude fundamental frequency signal, without harmonics. It can be recognized that whereas the primary function of the system, namely eliminating voltage sags or transients that require insertion of real power which is obtained from the dc energy storage device, the system also provides voltage regulation and harmonic reduction, which can involve only reactive and "harmonic" powers. Thus, the energy storage device is used only infrequently and for relatively short transient bursts during power system disturbances, and at all other times additional power quality improvements can be accomplished by the inverter subject to controller 38. As further discussed hereinbelow, a subportion of control 38 is utilized to control the operation of converter 32.

Figure 1B:
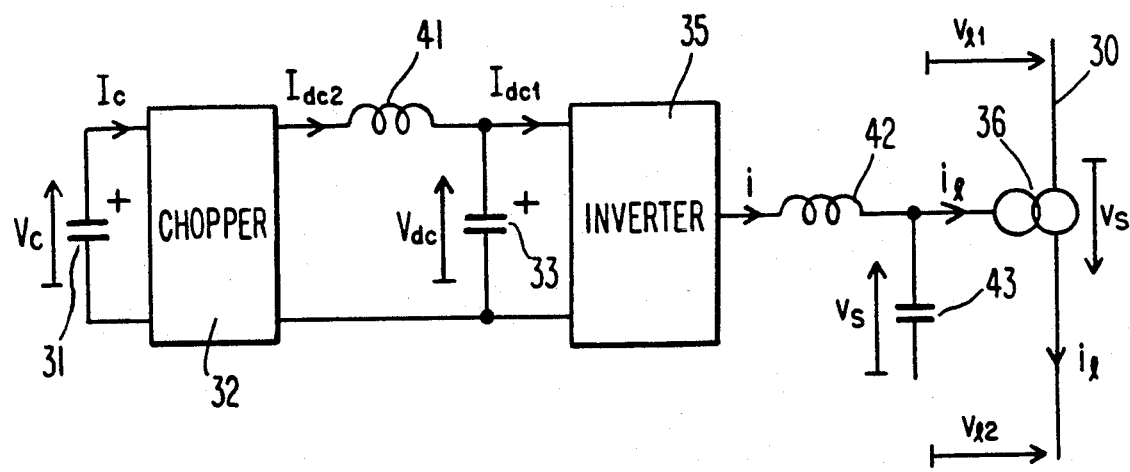
FIG. 1B is an effective equivalent circuit of the system of this invention.
Figure 1C:
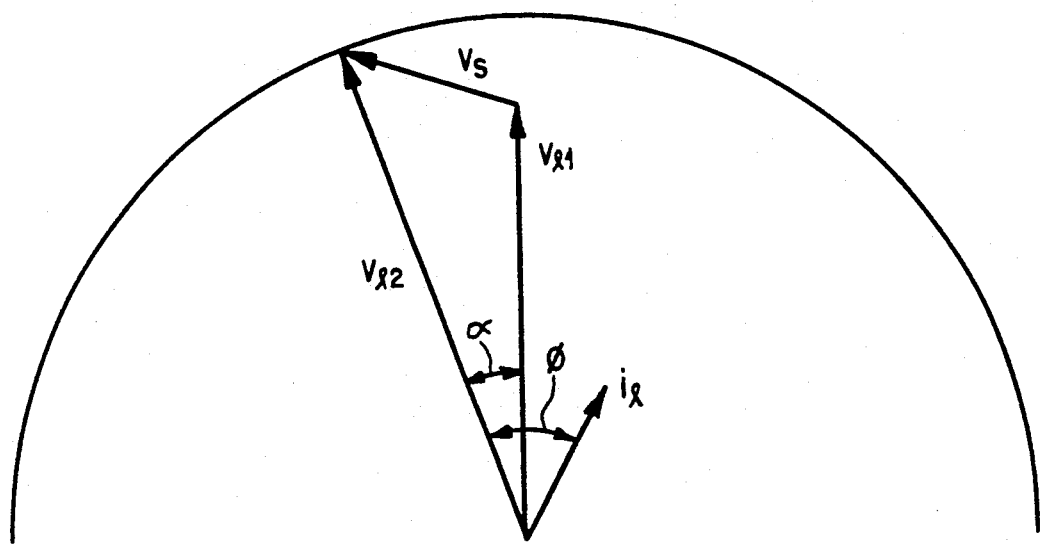
FIG. 1C is a vector diagram illustrating the currents and voltages associated with the operation of the dynamic voltage restorer system and method of this invention.

Referring now to FIGS. 1B and 1C, the various voltages and currents in the system as described are discussed. FIG. 1B is a functional equivalent diagram of the dynamic voltage restorer system of this invention, and provides a definition of the system variables and their sign conventions. As used herein, voltages and currents represented by capital letters are dc variables, whereas voltages and currents represented by lower case letters are transient, or ac variables. In FIG. 1B, the three-phase circuits fed by inverter 35 are shown symbolically in a single-line format, and the various three-phase voltages and currents are denoted as instantaneous space vectors. This vector representation is convenient for analysis of transient behavior and coincides with the conventional phaser representation under balanced steady-state sinusoidal conditions.

As seen in FIG. 1B, the dc voltage $V_c$ across storage device 31, and the current $I_c$, are coupled into the chopper unit 32. The output current $I_{dc2}$ is passed through an inductor 41, with the dc link voltage $V_{dc}$ generated across capacitor 33. The current into inverter 35 is illustrated as $I_{dc1}$. The output current i from inverter 35 is filtered through inductor 42 and capacitor 43. Note that the voltage $v_s$ across capacitor 43 is imposed upon the first winding of transformer 36. For this analysis, transformer 36 is assumed to have a turns ratio of 1:1, providing an insertion voltage of $v_s$. The voltage provided upstream from the insertion device 36 is $v_{11}$, and the distributor line voltage downstream, which is provided to the various loads tied to line 30, is illustrated as $v_{12}$. The current on the line is illustrated as $i_1$.

The relevant ac signals are presented in vector representation in FIG. 1C. For this illustration, the compensated voltage which is delivered to the load ($v_{12}$) is represented as a vector having a constant magnitude and an arbitrary phase angle. Thus, whatever the power factor of the load, and whatever the disturbance on the line, the length of vector $v_{12}$ is represented as a constant, as illustrated by the circle to which the $v_{12}$ vector points. As seen in this diagram, $v_{12}$ equals $v_{11}$ plus $v_s$. The phase difference between $v_{11}$ and $v_{12}$, caused by introduction of $v_s$, is represented as $\alpha$; the phase difference between $v_{12}$ and the load current $i_1$ is $\Phi$ (voltage is shown lagging current).

Figure 2A:
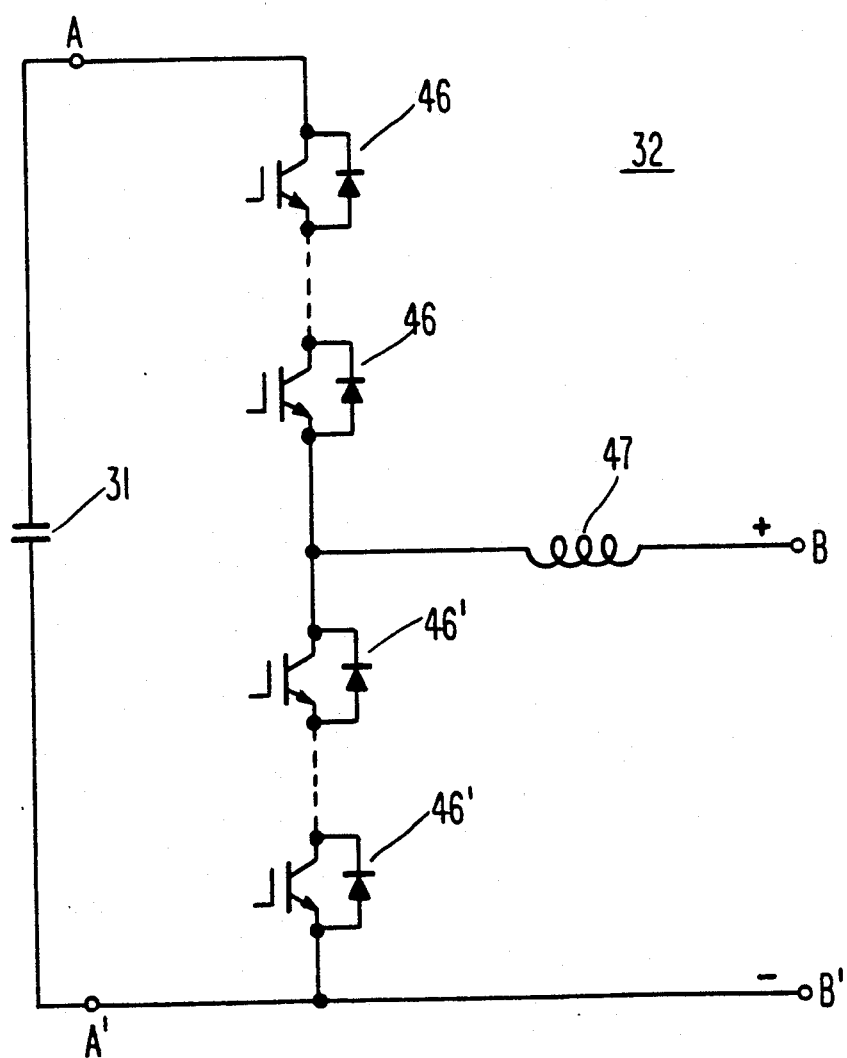
FIG. 2A is a simplified circuit diagram showing an embodiment of a chopper used in a preferred embodiment of this invention.

Referring now to FIG. 2A, there is illustrated a two-quadrant chopper, a well known circuit building block, which is used as the interface module 32 for providing a constant voltage to the inverter dc link. The upper (46) and lower (46') strings of switches, suitably IGBTs, are alternately switched on and off at a high frequency to control the average value of the current in the inductor 47, the output of which inductor is connected to the inverter dc link as shown at nodes B—B'. The switching duty cycle, which is controlled by controller 38, is suitably proportional to the ratio of the inverter dc link voltage to the voltage of the energy storage capacitor 31. As discussed in more detail below, the inverter dc link voltage is utilized as part of the control loop to generate the set point for controlling the output through inductor 47. It is to be noted that equivalent interface circuits can be used, and indeed a multiphased chopper can be used to increase the power level when the current can no longer be increased by using larger devices. Further, while such a chopper interface circuit is illustrated for the preferred embodiment, it is to be understood that the invention does not require an interface circuit between the storage element and the module that generates the insertion voltage.

Figure 2B:
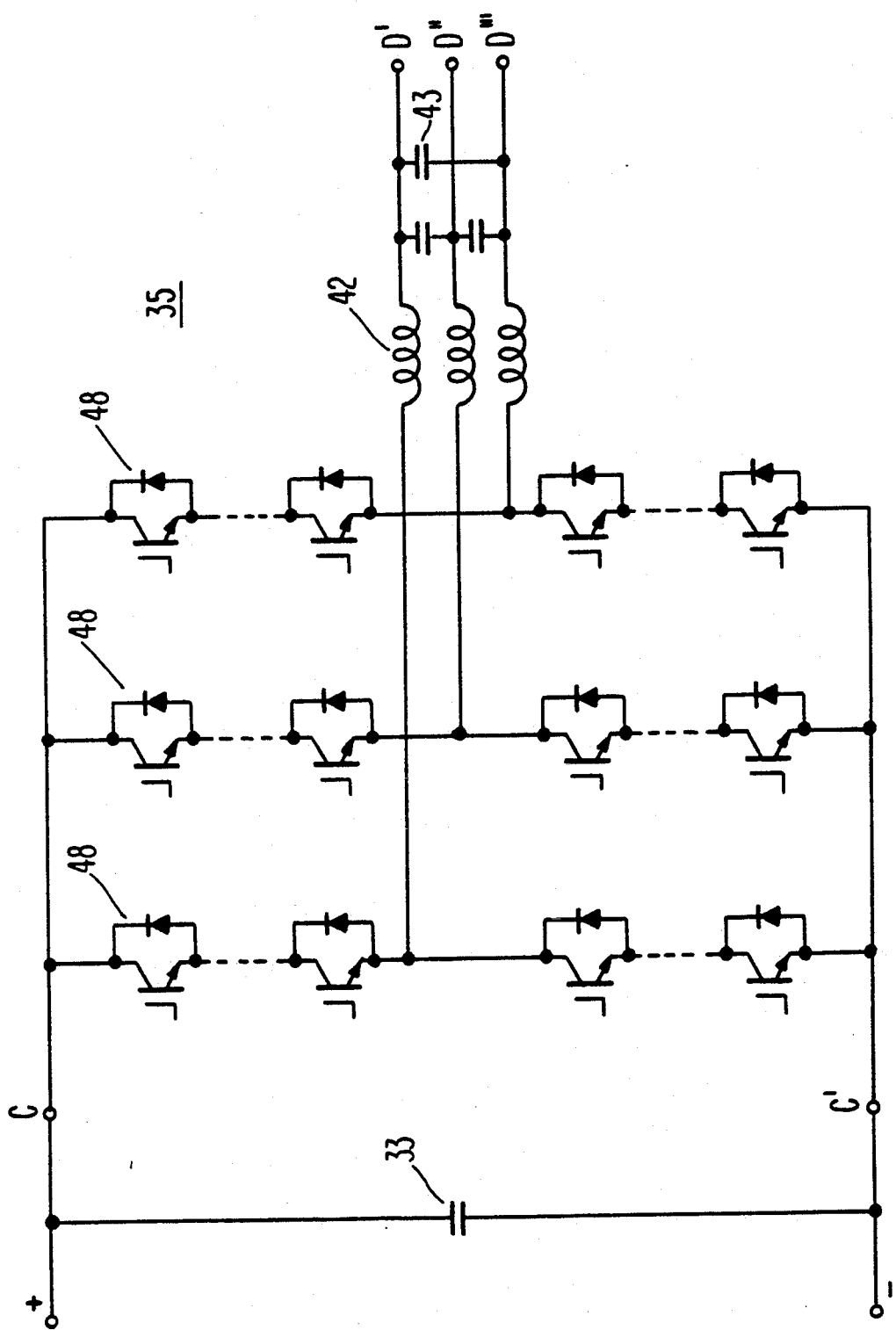
FIG. 2B is a simplified circuit diagram showing an embodiment of an inverter used in a preferred embodiment of this invention.

Referring now to FIG. 2B, there is shown a schematic diagram of a suitable inverter module 35. Module 35 takes the dc link voltage across capacitor 33, and transforms it into insertion signals for the three phases, as illustrated at output nodes D', D" and D'". The inverter illustrated is a standard six-pulse voltage source-type inverter, which is operated with a pulse width modulation (PWM) strategy to achieve good waveform quality and high control bandwidth. The inverter output is filtered to eliminate the high frequency components that result from the modulation process. The illustrated inverter module is a well-known circuit, it being understood that PWM control of each respective string of switches (upper and lower strings for each phase) can produce a controlled output for each phase. The inverter output is filtered at 42, 43 to eliminate the high frequency components that result from the modulation process, such that the voltage impressed on the inverter side of the coupling transformer 36 has virtually no undesired frequency components. Further, to increase the power of the inverter subsystem, additional inverter modules can be paralleled between the terminals C—C' and the output filter capacitors 43. Each inverter has its own output filter inductor 42, and each inverter module is separately current regulated using a common set point. Additional modulation filtering, or a reduction in the filter component sizes, can be achieved by phase staggering the carriers for each inverter modulator by 360/N degrees, where N is the number of inverter modules. This arrangement is preferable to direct paralleling of power devices.

It is again noted that the combination of a chopper and fixed dc link inverter is the preferred embodiment, for reasons of cost and performance. However, it is possible to configure a system without a chopper, and operate the inverter with a variable dc link voltage, and with appropriate PWM modulation strategy. Also, while the invention has been illustrated utilizing a voltage source inverter, a current source version can equally be implemented. Either version, with appropriate control, can provide for generation of a dynamic injection voltage ($v_s$) which is series added to the source side of the power line. As used herein, dynamic or dynamically refers to substantially instantaneous generation of an injection signal which compensates for variations in the source voltage from the norm, so that the voltage signal delivered to the loads is not substantially affected by transient disturbances.

Figure 3:
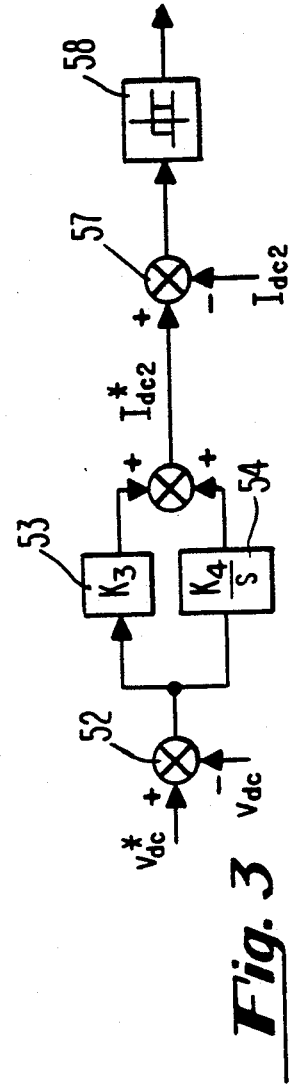
FIG. 3 is a simplified block diagram of a control circuit for controlling a chopper as used in this invention.

Referring now to FIG. 3, a simplified schematic of an embodiment for controlling the chopper, or converter 32, is shown. This is a portion of what is termed by applicant as the "internal" control portion of controller 38, and is an autonomous subsystem that serves to regulate the chopper dc output voltage, $V_{dc}$. The chopper output signal is compared to a reference value $V^*_{dc}$, which reference value is provided by a conventional reference signal circuit. An error signal comparing these two voltages is generated at comparison 52, and passed through a proportional plus integral compensator 53, 54, 55 to generate a reference value $I^*_{dc}$ for the chopper current, $I_{dc2}$. The comparison between this reference signal and the actual dc current from the chopper, $I_{dc2}$, is made at comparison circuit 57, the error signal being used in a feedback loop that acts on the chopper switching duty cycle. As illustrated in FIG. 3, the chopper control 58 is shown as a simple hysteresis-type controller. This arrangement, or equivalent control circuit, ensures that the inverter dc-side terminals are maintained at a substantially constant voltage while power is passed to the storage capacitor through the chopper.

Figure 4:
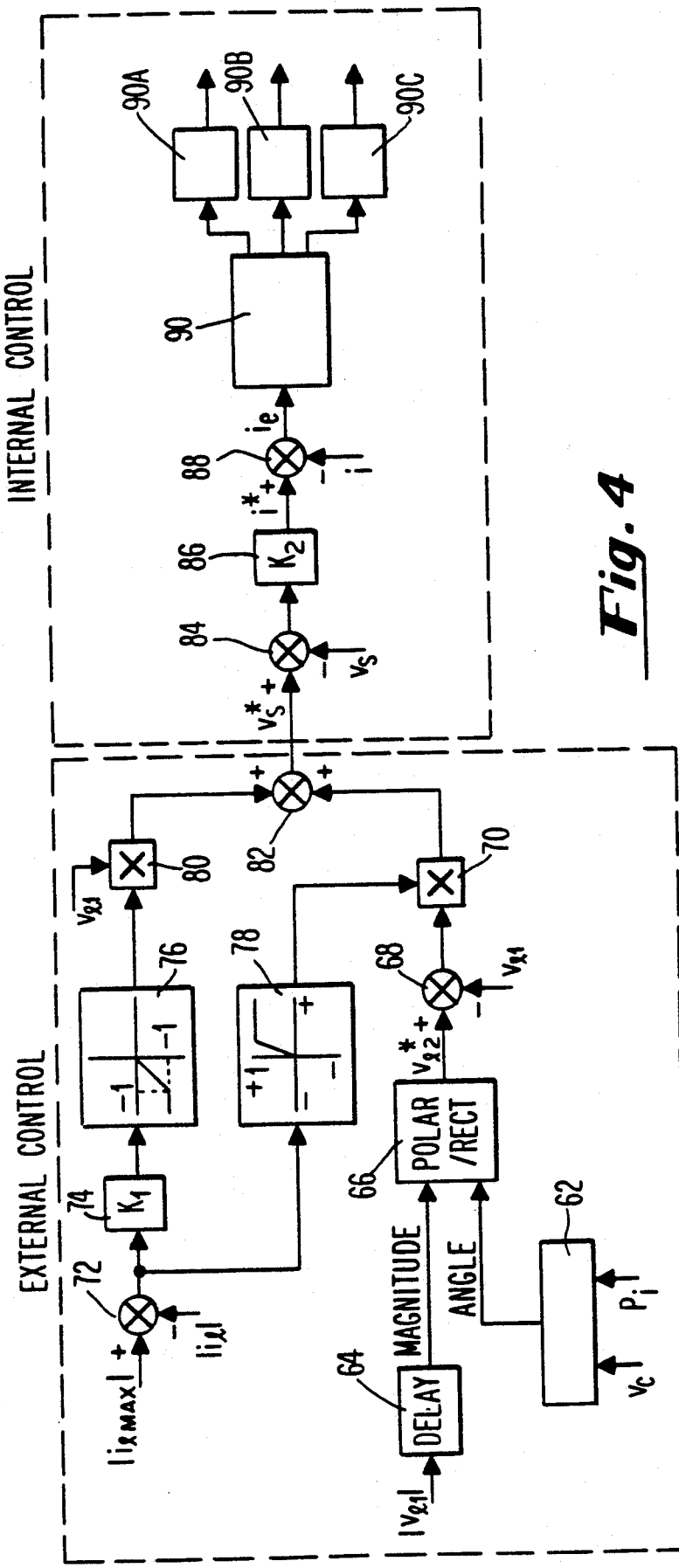
FIG. 4 is a simplified block diagram showing the control circuit for generating the control signal (or signals) for controlling the inverter circuit of this invention.

Referring now to FIG. 4, the remainder of the controller circuitry is shown, divided into what are termed the "internal control" portion and the "external control" portion. The internal control portion is devoted to controlling the series-injected voltage, $v_s$, to follow a generated reference value $v_s^*$. In other words, the internal control portion takes an externally generated signal ($v_s^*$) and uses it to control the inverter output. The external control portion receives signals from outside of the controller, and generates the reference value $v_s^*$.

Referring first to the internal control portion, the measured series-injected voltage, $v_s$, is compared to the reference signal $v_s^*$ at circuit 84. The detected error in the series voltage vector is amplified at 86, to produce a reference current vector, $i^*$. This reference vector is compared with the charging current vector i, delivered from the inverter at 88, for generating an error vector $i_e$ which is used to control the switching duty cycles of the inverter, and thus the inverter output voltages. In FIG. 4, the error signal is shown transformed into three separate phase error signals at 90, and applied to modulators 90A, 90B and 90C, for generating the inverter control signals.

The operation of the external control portion of the controller, as illustrated in FIG. 4, is based upon the external control philosophy of the dynamic voltage restorer of this invention. The internal and external control are, as shown, coordinated, and must provide for regulation of real power flow. The external control is designed to produce one resultant action, namely to generate a series voltage vector reference, $v_s^*$. For defining this series voltage demand, the external control seeks to achieve the following objectives, listed in order of priority:

a) limit the power line current (and hence the dynamic voltage restorer current) to a preset limit, $|i_{1-max}|$;

b) maintain the load-side voltage at a specified nominal level; and c) optimize the real power flow from the dynamic voltage restorer to the distribution line. Depending upon prevailing conditions, the optimum power level is either the minimum achievable positive value, zero terminal power, or a negative value suitable for charging the energy storage device.

Referring to the upper branch of the external control, there is shown a current limiting path. The automatic current limiting function produces no effect until the measured line current vector comes greater than the preset limit in magnitude. This comparison is made at 72. When the line current is greater than the predetermined maximum magnitude, all other criteria for determining $v_s^*$ are overridden. In this case, the difference signal is amplified at 74, and the signal is made negative at 76. At 80, the source side voltage vector, $v_{11}$, is multiplied by the negative proportionality signal from 76, and fed to gate 82. Under these circumstances, the series injected voltage is controlled so as to reduce the load side voltage and maintain a reduced level of load current. For all values of load currents having magnitudes less than the maximum, positive current difference signals are generated at 78 and coupled to multiplier 70, to affect the magnitude of the generated voltage reference signal.

The portion of the external control that is generally operative to generate the $v_s^*$ signal generates a reference vector, $v_{12}^*$, which represents the desired value of the load side voltage vector $v_{12}$. This reference is a vector having a magnitude and an angle, thereby defining the desired load side voltage for each phase on a dynamic, or continuous basis. By continuously defining this vector reference, the dynamic voltage restorer of this invention is capable of correcting for voltage deviations dynamically, i.e., on a sub-cycle time frame. In order to understand the problem solved in defining the $v_{12}^*$ vector, reference is made back to FIG. 1C. The source side voltage, $v_{11}$, is arbitrarily represented as having a magnitude less than the nominal full voltage magnitude, thereby representing a sag condition. The load side power factor is assumed to be lagging and constant. The aim of this invention is to maintain the magnitude of the load side voltage, $|v_{12}|$, at a constant value, such that the $v_{12}$ vector must lie somewhere on the circular locus of the radius as shown, at some angle e relative to $v_{11}$. The problem for the external control is that of choosing the magnitude of $|v_{12}|$ and angle $\alpha$.

It is noted that the expression for the real terminal power delivered from the dynamic voltage storer to the line, i.e., through the transformer 36, is power to the load minus power from the utility source, and is represented as follows:

$$Pi = |i|[|v_{12}|\cos(\Phi) - |v_{11}|\cos(\Phi - \alpha)]$$

The DVR terminal power thus varies sinusoidally as a function of the angle $\alpha$, having a minimum value when $\alpha = \Phi$. This minimum value may be positive or negative, depending on the ratio of $|v_{11}|$ and $|v_{12}|$. Further, it seen that the apparatus of this invention will be capable of regulating the load side voltage by supplying only reactive power when the ratio of $|v_{11}|$ to $|v_{12}|$ is greater than $\cos(\Phi)$.

Referring again to FIG. 4, it is observed that the magnitude of $|v_{12}^*|$ can be a constant representing the nominal system voltage, or can slowly adjust to the magnitude of $v_{11}$ after suitable delay. In the embodiment shown, such a delay is introduced at 64. The angle of $v_{12}^*$ is adjusted by a search algorithm introduced at block 62, which seeks the optimum power point for delivery of power from the dynamic voltage restorer. This search procedure incorporates an incremental estimate of the derivative of power with respect to the angle, in a well known fashion. By moving $\alpha$ slowly in the direction of decreasing delivered power, an operating point is found where the derivative goes to zero, but provides either minimum or zero power. Thus, the search routine carried out at block 62, which is preferably executed by a microprocessor and suitable software, involves analyzing the power supplied by the inverter, $p_i$, and searching to see what angle for $v^*_{12}$ would provide minimum power. This angle, as well as the magnitude from delay 64, is inserted into circuit 66 which provides an output vector signal representative of both magnitude and angle. The thus generated reference, $v_{12}^*$, is compared at 68 with the load side vector $v_{11}$, and the difference is passed through multiplier 70 to gate 82 to generate $v_s^*$ dynamic reference signal.

The following are examples of search procedures, or search routines. As used in these examples, delta = a small perturbation to be added to or subtracted from the setpoint for search for the minimum or some other setpoint where the slope of the control function is unknown. As used, power = the search parameter (other search parameters are possible).

Example of Minimum Search:
```
repeat on a periodic basis:
  old_power : = power;
  setpoint : = setpoint + delta;
  wait            /* wait for response to new setpoint */
```

---continued
```
  if (power > old_power) setpoint : = setpoint − 2 * delta;
```
Example of Fixed Desired Output Search:
```
repeat on a periodic basis:
  old_power : = power;
  setpoint : = setpoint + delta
  wait            /* wait for response to new setpoint */
  if (((power < old_power) and (power < desired)) or
    ((power > old_power) and (power > desired)))
    setpoint : = setpoint − 2 * delta
```

It is noted that searching for a maximum value is also possible.

Although a preferred embodiment for generating an error signal (ie) has been illustrated, it is emphasized that equivalent controllers can be utilized. The controller 38 may be any desired combination of software and hardware, with the function and result of controlling the $v_s$ signal to dynamically compensate for disturbance variations in the supply signal $v_{11}$. In the system and method of this invention, it is important to control delivery of real power from the dynamic voltage restorer to the utility distribution feeder, and preferably to minimize this real power flow.

What is claimed is:

1. A system for compensating for disturbances in a power distribution lien by inserting a signal carrying real power into said lien when a disturbance occurs, said line receiving utility power at a source voltage from a source end and delivering power at a load voltage to one or more loads at a load end, said system comprising:
   an energy storage element for storing energy;
   a voltage generator operatively connected to said storage element, for dynamically generating a signal for injection into said line so as to correct for disturbances to the voltage signal from said source end;
   an injection circuit for injecting said dynamic injection signal into said line between said source end and said load end; and
   a controller for controlling said voltage generator as a function of real power delivered to said line by said injection circuit, whereby said injected signal is controlled to dynamically correct the voltage signal delivered at the load end and deliver real power to said line, so as to reduce the effect of disturbances on the line.

2. The system as described in claim 1, wherein said controller controls signal generator so as to maintain the voltage signal delivered at said load end substantially constant while minimizing real power delivery from the system to said line.

3. The system as described in claim 2, wherein said energy element is a dc storage element and said voltage generator comprises an inverter operatively connected to receive power from said energy storage element and provide a dynamic ac signal to said injection circuit.

4. The system as described in claim 3, further comprising a converter connected between said energy storage element and said inverter, said converter providing a substantially constant dc voltage to said inverter.

5. The system as described in claim 4, comprising a converter controller means for controlling said converter to provide said substantially constant dc voltage to said inverter.

6. The system as described in claim 1, wherein said injection circuit is a transformer.

7. The system as described in claim 1, wherein said controller comprises means for comparing the current delivered on said line to said one or more loads to a predetermined current limit, and for controlling said signal generator to generate said insertion signal so as to limit said load current whenever it reaches said predetermined limit.

8. The system as described in claim 1, wherein said controller has voltage signal means for generating a signal representative of a desired voltage signal at said line load end, and first error means for generating an error signal representative of the difference between said desired signal and the actual voltage signal at said line load end.

9. The system as described in claim 1, wherein said controller comprises means for generating a variable reference signal representing desired current to be delivered from said inverter, and second error signal means for generating an error signal representative of the difference between said desired current signal and actual current delivered by said inverter.

10. The system as described in claim 8, wherein said voltage signal means for generating said desired load voltage signal comprises means for generating said signal to represent minimum real power delivered to said line.

11. The system as described in claim 10, wherein said voltage signal means comprises a magnitude circuit for developing a signal representative of desired voltage magnitude and an angle circuit for developing a signal representative of the angle of said desired voltage signal.

12. A method of compensating for changes in the voltage delivered to a distribution line, said changes being introduced by disturbances in a utility network to which said line is connected, said line having a source end connected to receive a source voltage signal from said utility network and a load end connected to an electric load, comprising:
dynamically injecting a voltage signal into said line in series with said source voltage so as to compensate for any voltage variation due to a disturbance;
developing a signal representative of real power delivered to said line by said injected signal; and
adjusting said injected signal as a function of the real power delivered by said injected signal to said line.

13. The method as described in claim 12, comprising determining a direction of change of said injected signal for reducing real power delivered thereby while maintaining a load side voltage signal at a substantially constant voltage, and changing said injecting signal in said determined direction.

14. The method as described in claim 13, comprising adjusting the angle of said injected signal relative to the angle of said source voltage, so as to minimize real power delivered by said injected signal while holding the voltage delivered to the load substantially constant.

15. A system for compensating for disturbances in a power distribution line, said lien receiving a source voltage signal from a utility source at a source end and delivering an end voltage signal at a load end of said line, said system comprising:
a source of energy for delivering power during line disturbances;
voltage generator means operatively connected to said energy source and controllable for dynamically generating a signal for injection into said line so as to deliver power to said line and correct for disturbances to said source voltage signal;
an injection circuit for injecting said dynamically generated signal into said line between said source end and said load end; and
controller means for controlling said voltage generator means, said controller means having control signal means for generating control signals as a function of the voltage signal delivered by the line to said load end and of the real power delivered by said injection circuit into said line.

16. The system as described in claim 15, wherein said controller means comprises power control means for reducing real power delivered by said injection circuit during disturbances while maintaining the voltage signal at said load end substantially constant.

17. The system as described in claim 16, wherein said power control means comprises means for determining a direction of change of said injected signal for reducing real power delivered thereby, and changing means for changing said injected signal in said determined direction.

18. The system as described in claim 15, wherein said controller means comprises adjusting means for adjusting the angle of said injected signal relative to the angle of said source voltage so as to minimize real power delivered by said injected signal while holding the voltage delivered to the load substantially constant.

* * * * *